US012586106B2

(12) United States Patent
Tyrrell et al.

(10) Patent No.: US 12,586,106 B2
(45) Date of Patent: Mar. 24, 2026

(54) COMPREHENSIVE LIABILITY MANAGEMENT PLATFORM FOR CALCULATION OF MULTIPLE ALTERNATIVE SCENARIOS

(71) Applicant: Mitchell International, Inc., San Diego, CA (US)

(72) Inventors: Norman Tyrrell, San Diego, CA (US); Christopher Williamson, San Diego, CA (US)

(73) Assignee: MITCHELL INTERNATIONAL, INC., San Diego, CA (US)

( * ) Notice: Subject to any disclaimer, the term of this patent is extended or adjusted under 35 U.S.C. 154(b) by 215 days.

(21) Appl. No.: 18/231,934

(22) Filed: Aug. 9, 2023

(65) Prior Publication Data

US 2024/0086983 A1 Mar. 14, 2024

Related U.S. Application Data

(60) Provisional application No. 63/405,706, filed on Sep. 12, 2022.

(51) Int. Cl.
*G06Q 30/04* (2012.01)

(52) U.S. Cl.
CPC .................................... *G06Q 30/04* (2013.01)

(58) Field of Classification Search
CPC ............................... G06Q 30/04; G06Q 40/08
See application file for complete search history.

(56) References Cited

U.S. PATENT DOCUMENTS

2006/0116913 A1* 6/2006 Hansan .................. G06Q 40/08 705/4
2020/0090282 A1* 3/2020 Tyrrell ................... G06Q 40/08
2020/0244542 A1* 7/2020 Navarrete .......... G06Q 30/0201
2023/0260048 A1* 8/2023 Hayward ............... G06Q 40/08 705/4

* cited by examiner

*Primary Examiner* — A. Hunter Wilder
(74) *Attorney, Agent, or Firm* — Sheridan Ross P.C.

(57) ABSTRACT

A computer-implemented method for adjusting one or more electronic medical bills for a claimant injured in an accident comprises generating a user interface to be presented to a claims adjuster; receiving a first user input identifying a claimant; responsive to the first user input, retrieving and aggregating multiple electronic medical bills each having at least one line; generating one or more findings and multiple scenarios by providing the aggregated electronic medical bills as inference input to a trained machine learning model, wherein the trained machine learning model has been trained with historical electronic medical bills and corresponding findings and scenarios, wherein responsive to the inference input, the trained machine learning model outputs the one or more findings and the multiple scenarios, wherein the one or more findings represent rationales for approving, denying, or repricing, and wherein the multiple scenarios include cost estimates based on the one or more findings.

25 Claims, 7 Drawing Sheets

FIG. 5
Mitchell Adjuster Workspace
Dashboard
Claimant Workspace
Medicals
Facts of Loss
Personal trainer
Diabetes
Automobile Liability
MITCHELLDEMO
Mitchell Demo
Johnson Johnson
View Documents
Hide Claim
Medicals
Sort By: First DOS: First to Last
Add Provider
THE DCH HEALTHCARE AUTHORITY
Complete
$4,514.29
$4,460.00
$5,323.03
$835.00
Use Recommended
Consider 500 as minimal amount due to something I found in the medical records
Emergency Physician Profession Association (Calderon, Darrell)
Settings
Help
Sign Out

COMPREHENSIVE LIABILITY MANAGEMENT PLATFORM FOR CALCULATION OF MULTIPLE ALTERNATIVE SCENARIOS

CROSS REFERENCE TO RELATED APPLICATIONS

The present application claims priority to U.S. Provisional Patent Application No. 63/405,706, filed Sep. 12, 2022, entitled "COMPREHENSIVE THIRD PARTY LIABILITY MANAGEMENT PLATFORM FOR CALCULATION OF MULTIPLE ALTERNATIVE SCENARIOS," the disclosure thereof incorporated by reference herein in its entirety.

DESCRIPTION OF RELATED ART

The disclosed technology relates generally to liability management platforms, and more particularly some embodiments relate to calculation of multiple alternative scenarios for such liability.

SUMMARY

In general, one aspect disclosed features system for adjusting one or more electronic medical bills for a claimant injured in an accident, comprising: one or more hardware processors; and one or more non-transitory machine-readable storage media encoded with instructions executable by the one or more hardware processors to perform operations comprising: generating a user interface to be presented to a claims adjuster; receiving a first user input via the user interface, the first user input identifying a claimant; responsive to receiving the first user input, retrieving and aggregating multiple electronic medical bills, each electronic medical bill having at least one line, each line representing a medical service provided to the identified claimant; generating one or more findings and multiple scenarios by providing the aggregated electronic medical bills as inference input to a trained machine learning model, wherein the trained machine learning model has been trained with historical electronic medical bills and corresponding findings and scenarios, wherein responsive to the inference input, the trained machine learning model outputs the one or more findings and the multiple scenarios, wherein the one or more findings represent rationales for approving, denying, or repricing at least one of the lines of the electronic medical bills, and wherein the multiple scenarios include cost estimates based on the one or more findings; presenting the one or more findings and the one or more scenarios in the user interface; receiving second user input via the user interface, the second user input representing a selected one of the scenarios; and responsive to the second user input, generating at least one adjusted electronic medical bill.

Embodiments of the system may include one or more of the following features. In some embodiments, the operations further comprise: receiving third user input via the user interface, the third user input representing an acceptance or rejection of one or more lines of one of the electronic medical bills; and responsive to the third user input, modifying at least one of the scenarios; and presenting the modified at least one of the scenarios in the user interface. In some embodiments, the operations further comprise: obtaining a training data set comprising the historical electronic medical bills and corresponding findings and scenarios; and training the machine learning model using the training data set. In some embodiments, the rationales represented by the one or more findings comprise at least one of: vertical determinations based on intervals between a date of injury of the claimant and a date of a corresponding treatment identified in the aggregated electronic medical bills; and horizontal determinations based on known effectiveness of a treatment identified in the aggregated electronic medical bills.

In some embodiments, the operations further comprise: presenting, in the user interface, at least one of: a charged amount representing a total cost corresponding to the aggregated electronic medical bills; a low evaluation amount corresponding to the scenario having the lowest cost estimate; a high evaluation amount corresponding to the scenario having the highest cost estimate; and a recommended amount corresponding to the selected one of the scenarios. In some embodiments, the operations further comprise: determining a likelihood of acceptance of the recommended amount based on historical acceptances of recommended amounts by at least one of attorneys and law firms; and presenting, in the user interface, a representation of the likelihood of acceptance of the recommended amount. In some embodiments, determining a likelihood of acceptance of the recommended amount comprises: providing the selected one of the scenarios as further inference input to a further trained machine learning model, wherein the further trained machine learning model has been trained with historical scenarios and corresponding acceptances of recommended amounts, wherein responsive to the inference input, the further trained machine learning model outputs the likelihood of acceptance of the recommended amount.

In general, one aspect disclosed features one or more non-transitory machine-readable storage media encoded with instructions executable by the one or more hardware processors to perform operations for adjusting one or more electronic medical bills for a claimant injured in an accident, the operations comprising: generating a user interface to be presented to a claims adjuster; receiving a first user input via the user interface, the first user input identifying a claimant; responsive to receiving the first user input, retrieving and aggregating multiple electronic medical bills, each electronic medical bill having at least one line, each line representing a medical service provided to the identified claimant; generating one or more findings and multiple scenarios by providing the aggregated electronic medical bills as inference input to a trained machine learning model, wherein the trained machine learning model has been trained with historical electronic medical bills and corresponding findings and scenarios, wherein responsive to the inference input, the trained machine learning model outputs the one or more findings and the multiple scenarios, wherein the one or more findings represent rationales for approving, denying, or repricing at least one of the lines of the electronic medical bills, and wherein the multiple scenarios include cost estimates based on the one or more findings; presenting the one or more findings and the one or more scenarios in the user interface; receiving second user input via the user interface, the second user input representing a selected one of the scenarios; and responsive to the second user input, generating at least one adjusted electronic medical bill.

Embodiments of the media may include one or more of the following features. In some embodiments, the operations further comprise: receiving third user input via the user interface, the third user input representing an acceptance or rejection of one or more lines of one of the electronic medical bills; responsive to the third user input, modifying at least one of the scenarios; and presenting the modified at least one of the scenarios in the user interface. In some embodiments, the operations further comprise: obtaining a training data set comprising the historical electronic medical bills and corresponding findings and scenarios; and training the machine learning model using the training data set. In some embodiments, the rationales represented by the one or more findings comprise at least one of: vertical determinations based on intervals between a date of injury of the claimant and a date of a corresponding treatment identified in the aggregated electronic medical bills; and horizontal determinations based on known effectiveness of a treatment identified in the aggregated electronic medical bills.

In some embodiments, the operations further comprise: presenting, in the user interface, at least one of: a charged amount representing a total cost corresponding to the aggregated electronic medical bills; a low evaluation amount corresponding to the scenario having the lowest cost estimate; a high evaluation amount corresponding to the scenario having the highest cost estimate; and a recommended amount corresponding to the selected one of the scenarios. In some embodiments, the operations further comprise: determining a likelihood of acceptance of the recommended amount based on historical acceptances of recommended amounts by at least one of attorneys and law firms; and presenting, in the user interface, a representation of the likelihood of acceptance of the recommended amount. In some embodiments, determining a likelihood of acceptance of the recommended amount comprises: providing the selected one of the scenarios as further inference input to a further trained machine learning model, wherein the further trained machine learning model has been trained with historical scenarios and corresponding acceptances of recommended amounts, wherein responsive to the inference input, the further trained machine learning model outputs the likelihood of acceptance of the recommended amount.

In general, one aspect disclosed features a computer-implemented method for adjusting one or more electronic medical bills for a claimant injured in an accident, the method comprising: generating a user interface to be presented to a claims adjuster; receiving a first user input via the user interface, the first user input identifying a claimant; responsive to receiving the first user input, retrieving and aggregating multiple electronic medical bills, each electronic medical bill having at least one line, each line representing a medical service provided to the identified claimant; generating one or more findings and multiple scenarios by providing the aggregated electronic medical bills as inference input to a trained machine learning model, wherein the trained machine learning model has been trained with historical electronic medical bills and corresponding findings and scenarios, wherein responsive to the inference input, the trained machine learning model outputs the one or more findings and the multiple scenarios, wherein the one or more findings represent rationales for approving, denying, or repricing at least one of the lines of the electronic medical bills, and wherein the multiple scenarios include cost estimates based on the one or more findings; presenting the one or more findings and the one or more scenarios in the user interface; receiving second user input via the user interface, the second user input representing a selected one of the scenarios; and responsive to the second user input, generating at least one adjusted electronic medical bill.

Embodiments of the method may include one or more of the following features. Some embodiments comprise receiving third user input via the user interface, the third user input representing an acceptance or rejection of one or more lines of one of the electronic medical bills; and responsive to the third user input, modifying at least one of the scenarios; and presenting the modified at least one of the scenarios in the user interface. Some embodiments comprise obtaining a training data set comprising the historical electronic medical bills and corresponding findings and scenarios; and training the machine learning model using the training data set. In some embodiments, the rationales represented by the one or more findings comprise at least one of: vertical determinations based on intervals between a date of injury of the claimant and a date of a corresponding treatment identified in the aggregated electronic medical bills; and horizontal determinations based on known effectiveness of a treatment identified in the aggregated electronic medical bills.

Some embodiments comprise presenting, in the user interface, at least one of: a charged amount representing a total cost corresponding to the aggregated electronic medical bills; a low evaluation amount corresponding to the scenario having the lowest cost estimate; a high evaluation amount corresponding to the scenario having the highest cost estimate; and a recommended amount corresponding to the selected one of the scenarios. Some embodiments comprise determining a likelihood of acceptance of the recommended amount based on historical acceptances of recommended amounts by at least one of attorneys and law firms; and presenting, in the user interface, a representation of the likelihood of acceptance of the recommended amount.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

The figures are not exhaustive and do not limit the present disclosure to the precise form disclosed.

DETAILED DESCRIPTION

Figure 1:
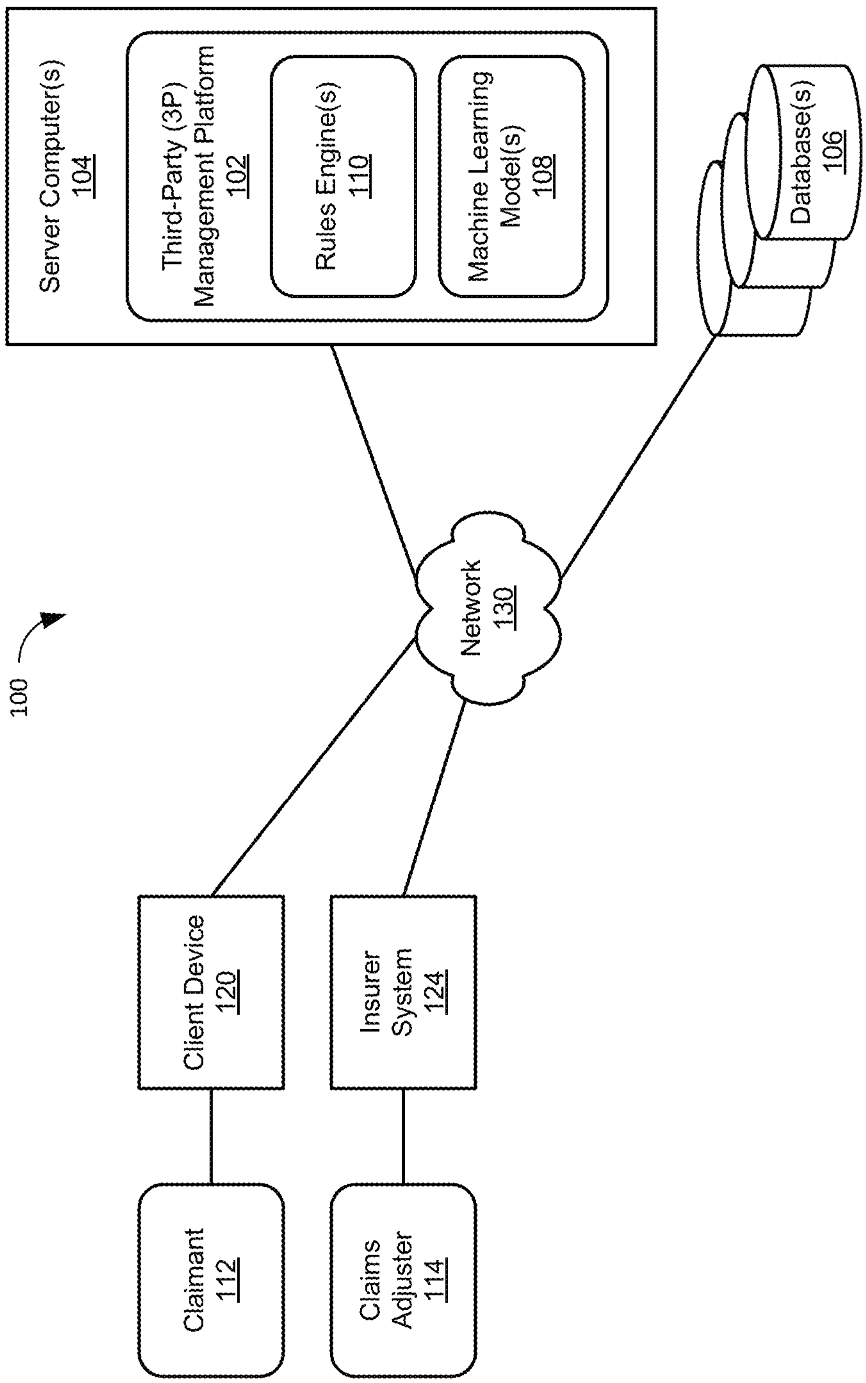
FIG. 1 illustrates a comprehensive liability management platform for calculation of multiple alternative scenarios according to some embodiments of the disclosed technology.

FIG. 1 illustrates a comprehensive liability management platform for calculation of multiple alternative scenarios 100 according to some embodiments of the disclosed technology. The system 100 may include a Third-party (3P) Liability Management Platform 102. The 3P Management Platform 102 may be implemented as one or more software packages executing on one or more server computers 104. The 3P Management Platform 102 may include a rules engine 110 to execute one or more rules. The 3P Management Platform 102 may include one or more machine learning models 108. The machine learning models 108 may be implemented in any manner. The machine learning models 108 may be implemented as trained machine learning models, for example as described below.

The system 100 may include one or more databases 106. In some embodiments, the databases 106 may store rules for execution by the rules engine 110 of the 3P Management Platform 102. The rules may be different for each insurer using the 3P Management Platform. In some embodiments, the databases 106 may store catalogues of pricing information.

Multiple users may interact with the 3P Management Platform. For example, referring to FIG. 1, the users may include the claimant 112, a third-party claims adjuster 114, and the like. Each user may employ a respective device or system. The claimant 112 may employ a client device 120. The claims adjuster 114 may employ a client device 122. The system 100 may include a third-party insurer system 124 of the third-party claimant's insurer. Each device or system may be implemented as a computer, smart phone, smart glasses, electronic embedded computers and displays, and the like. Each user may employ the client device or system to access the 3P Management Platform 102 over a network 130 such as the Internet.

Figure 2:
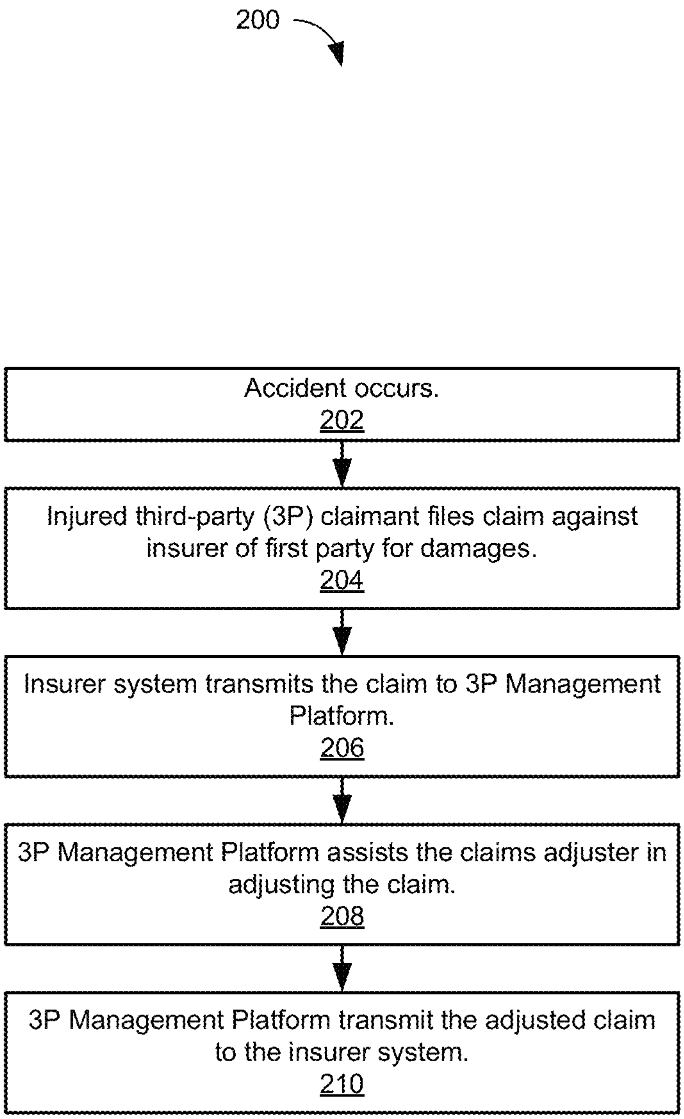
FIG. 2 illustrates a process for managing liability claims according to some embodiments of the disclosed technology.

FIG. 2 illustrates a process 200 for managing liability claims according to some embodiments of the disclosed technology. The elements of the disclosed processes are presented in a particular order. However, it should be understood that, in various embodiments, one or more elements may be performed in a different order, in parallel, or omitted. Portions of the process 200 may be performed, for example, by the 3P Management Platform 102 of FIG. 1.

Referring to FIG. 2, the process 200 may begin with an accident, at 202. In this disclosure, the accidents are described as vehicle accidents involving bodily injury. However, it should be understood that the disclosed technologies apply to other accidents as well.

The described examples include third-party claims. A third-party claim is a claim by a claimant against the insurance policy of another person, or of another entity such as a business. In contrast, a first-party claim is a claim by a claimant against the claimant's own insurance policy. The adjustment of third-party claims differs markedly from that of first-party claims. In adjusting a first-party claim, an insurance adjuster will generally treat each bill individually. But in adjusting a third-party claim, an insurance adjuster will generally treat all bills related to a single accident together.

In the described examples, the accident involves two persons and one or more vehicles. One of the persons is the third-party claimant. The other person is an insured party. The third-party claimant files a claim against the insurance policy of the insured party. In the accident, the third-party claimant and the insured party may occupy the same vehicle or different vehicles. The third-party claimant may be insured by the same insurer as the insured party, but under a different policy. The third-party claimant may be insured by a different insurer as the insured party, or may be uninsured.

Referring again to FIG. 2, the process 200 may continue when the injured third-party (3P) claimant files a claim against the insurer of the first party for damages, at 204. For example, referring again to FIG. 1, the claimant 112 may employ client device 122 to file the claim in the insurer system 124. Of course, the claimant may employ other methods to file the claim. The claim may include one or more medical bills, which may be electronic medical bills, which may be stored in the databases 106.

Referring again to FIG. 2, the process 200 may continue when the insurer system 124 transmits the claim to the 3P Management Platform 102, at 206. The 3P Management Platform 102 may store the claim in databases 106. Referring to FIG. 1, the 3P Management Platform 102 assists the claims adjuster 114 in adjusting the claim, at 208, for example as described in detail below. After adjustment, the 3P Management Platform 102 may transmit the adjusted claim to the insurer system 124, at 210.

Figure 3:
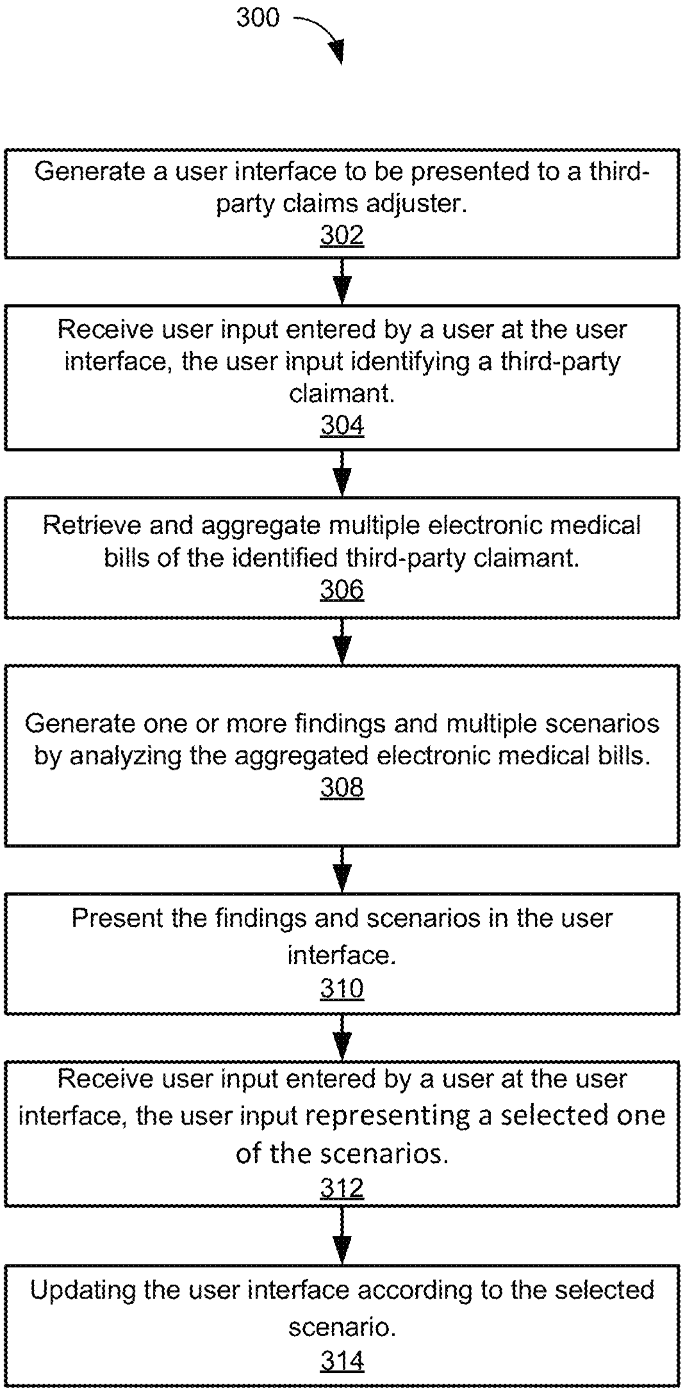
FIG. 3 illustrates a process for accident notification and adjudication workflow according to some embodiments of the disclosed technology.

FIG. 3 illustrates a process 300 for an accident notification and adjudication workflow according to some embodiments of the disclosed technology. Portions of the process 300 may be performed, for example, by the 3P Management Platform 102 of FIG. 1. The process 300 may correspond to step 208 of the process 200 of FIG. 2.

Referring to FIG. 3, the 3P Management Platform 102 may generate a user interface to be presented to the claims adjuster 114, at 302. The user interface may allow the claims adjuster 114 to enter input identifying the third-party claimant. The 3P Management Platform 102 may receive the user input, at 304.

Responsive to receiving the user input, the process 300 may include retrieving and aggregating multiple electronic medical bills corresponding to the received claim of the identified third-party claimant, at 306. Each electronic medical bill may have at least one line. Each line may represent a medical service provided to the identified third-party claimant.

The process 300 may include generating one or more findings and multiple scenarios by analyzing the aggregated electronic medical bills according to one or more rules and one or more dimensions, at 308. Each finding may represent a rationale for approving or denying at least one of the lines of the medical bills. Each scenario may be based on one or more of the findings. For example, each scenario may be based on a different subset of the findings. Each scenario may include a corresponding cost recommendation.

The aggregated electronic medical bills may be analyzed according to one or more rules and/or one or more determinations. Each determination may be made according to one or more of the rules. The one or more determinations may include "vertical" determinations based on intervals between a date of injury of the third-party claimant and a date of a corresponding treatment identified in the aggregated electronic medical bills. The one or more determinations may include "horizontal" determinations based on known effectiveness of treatments identified in the aggregated electronic medical bills. In the example of FIG. 1, the rules may be retrieved from the database(s) 106 and executed by the rules engine(s) 110 of the 3P Management Platform 102.

In various embodiments, analyzing the aggregated electronic medical bills to generate findings and scenarios may involve the use of business rules, business logic, one or more trained machine learning models, or a combination thereof. For example, the platform 102 may provide the aggregated electronic medical bills as inference input to a trained machine learning model, where the trained machine learning model has been trained with historical electronic medical bills and corresponding findings and scenarios. Responsive to the inference input, the trained machine learning model may output the findings and scenarios. Some embodiments include training the machine learning model. For example, the platform 102 may obtain or generate a training data set comprising historical electronic medical bills and corresponding findings and scenarios, and may train the machine learning model using the training data set. In some embodiments, the training data set may include profiles of the claims adjusters.

The process 300 may include presenting the findings and scenarios in the user interface, at 310. The process 300 may include receiving user input entered by the claims adjuster 114 representing a selected one of the scenarios, at 312, and updating the user interface according to the selected scenario, at 314. The implementation of the disclosed user interfaces may be as disclosed in U.S. Pat. No. 10,817,948, the disclosure thereof incorporated by reference herein in its entirety.

Figure 4:
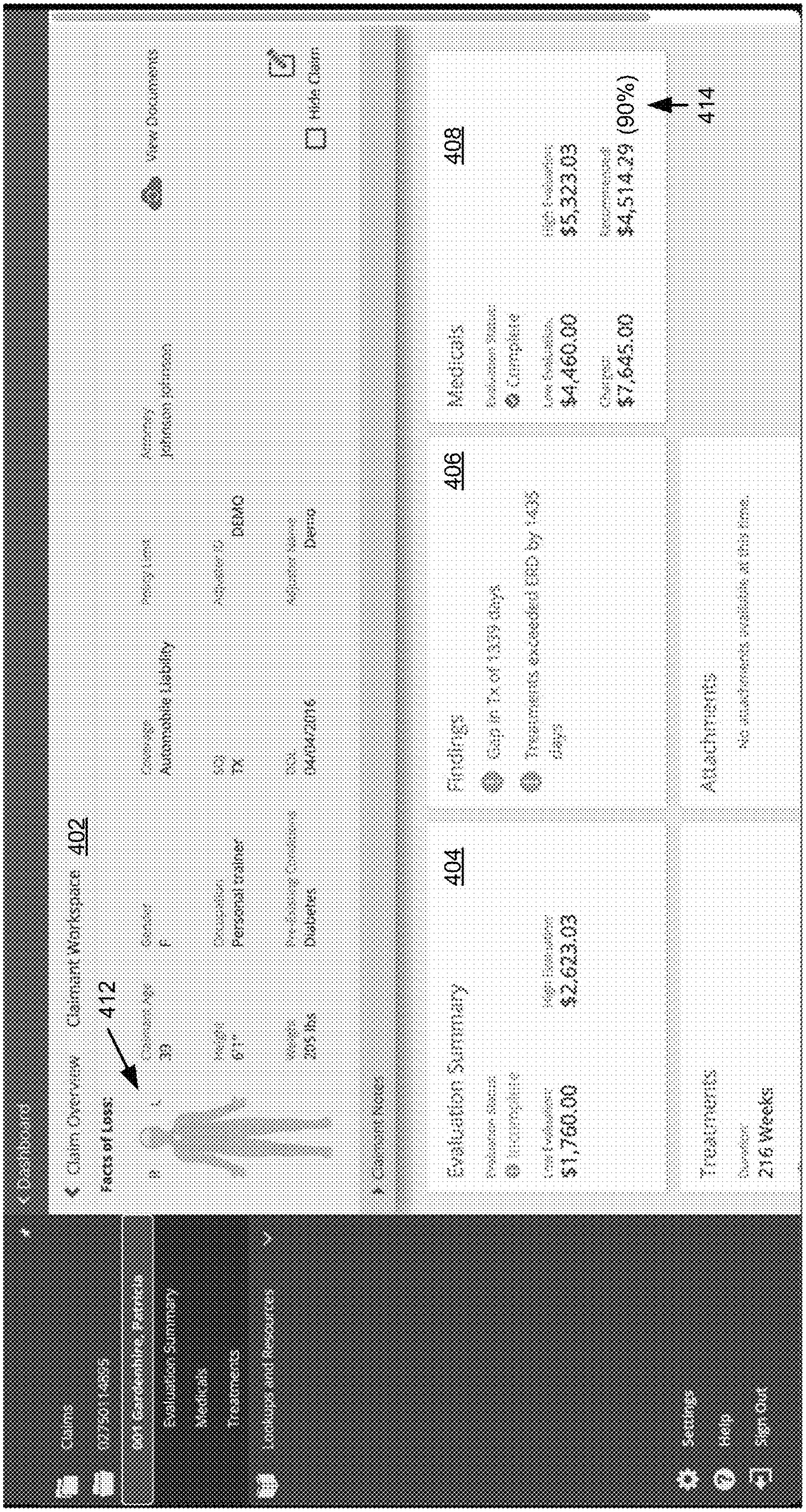
FIG. 4 illustrates an example user interface including one or more findings and one or more scenarios according to some embodiments of the disclosed technologies.

FIG. 4 illustrates an example user interface including one or more findings and one or more scenarios according to some embodiments of the disclosed technologies. Referring to FIG. 4, the user interface may include a claimant workspace 402 and multiple panels. The panels may include an evaluation summary panel 404, a findings panel 406, and a medicals panel 408. The claimant workspace 402 may present information concerning the third-party claimant. The information may include name, weight, height, gender, occupation, pre-existing conditions, occupation, state of jurisdiction (SOJ), and attorney representing the claimant. The claimant workspace 402 may include an injury severity heat map 412. In the example of FIG. 4, the injury severity heat map 412 may represent injury severity by color, with lighter colors representing less severe injuries.

The evaluation summary panel 404 includes a roll-up of all components of an injury evaluation in a single view. In this view, a claims adjuster 114 can document coverage and liability determinations, medical and non-medical expense evaluations, a general damages evaluation, and their plan to negotiate an injury settlement with the injured party or their attorney.

The findings panel 406 may present the one or more findings. In the example of FIG. 4, the findings indicate a large gap in treatment of 1339 days, and that the duration of treatment exceeded an expected recovery date (ERD) benchmark by 1435 days.

The medicals panel 408 may present costs associated with the scenarios. In the example of FIG. 4, the medicals panel 408 indicates the charged amount of $7,645.00, high and low evaluation dollar amounts of $5,323.03 and $4,460.00, respectively, and a recommended amount of $4,514.29. The charged amount represents a total cost corresponding to the aggregated electronic medical bills. The low evaluation amount corresponds to the scenario having the lowest cost estimate. The high evaluation amount corresponding to the scenario having the highest cost estimate. In the example of FIG. 4, the low and high evaluation amounts may correspond to 10 and 14 weeks of chiropractic care, respectively.

The recommended amount corresponds to the scenario selected by the claims adjuster 114. For example, the recommended amount may represents the outcome of one particular scenario, where the costs of treatments occurring past the ERD benchmark are denied. The user interface may enable the claims adjuster 114 to view, edit amounts, and allow or decline individual lines of the electronic medical bills.

The user interface allows the claims adjuster 114 to create additional scenarios and dollar amounts. For example, responsive to user selection of the Medicals panel 408, the 3P Management Platform 102 may generate another user interface to present individual lines of the electronic medical bills for one of the scenarios, and display elements operable by the claims adjuster 114 to accept or reject individual lines. Responsive to operation of these display elements, the 3P Management Platform 102 may modify corresponding scenario(s).

For example, the claims adjuster may create or select a scenario where only costs for treatments occurring after particular selected periods are denied, such as treatments occurring after one month beyond the ERD benchmark. Other sorts of scenarios may be generated as well. Responsive to modification of a scenario, the medicals panel 408 may be updated with the costs related to the modified scenario.

In some embodiments, the platform 102 may determine a likelihood of acceptance of the recommended amount. The likelihood of acceptance may be based on historical acceptances of recommended amounts by attorneys and/or law firms. The platform may present a representation of the likelihood of acceptance of the recommended amount in the user interface. For example, a 90% likelihood of acceptance of the recommended amount is shown in the user interface of FIG. 4 at 414.

Figure 5:
FIG. 5 depicts an example user interface for editing individual lines of the electronic medical bill of FIG. 4 according to some embodiments of the disclosed technology.

FIG. 5 depicts an example user interface for editing individual lines of the electronic medical bill of FIG. 4 according to some embodiments of the disclosed technology. The claims adjuster may view this user interface by selecting the Medicals panel 408 of the user interface of FIG. 4. The user interface of FIG. 5 displays a summary view of all medical bills being evaluated for an injured party. Billing data is summarized by provider with references to adjustments made in detailed procedure edit screens. This view enables negotiation from a top-down perspective of the claim.

Figure 6:
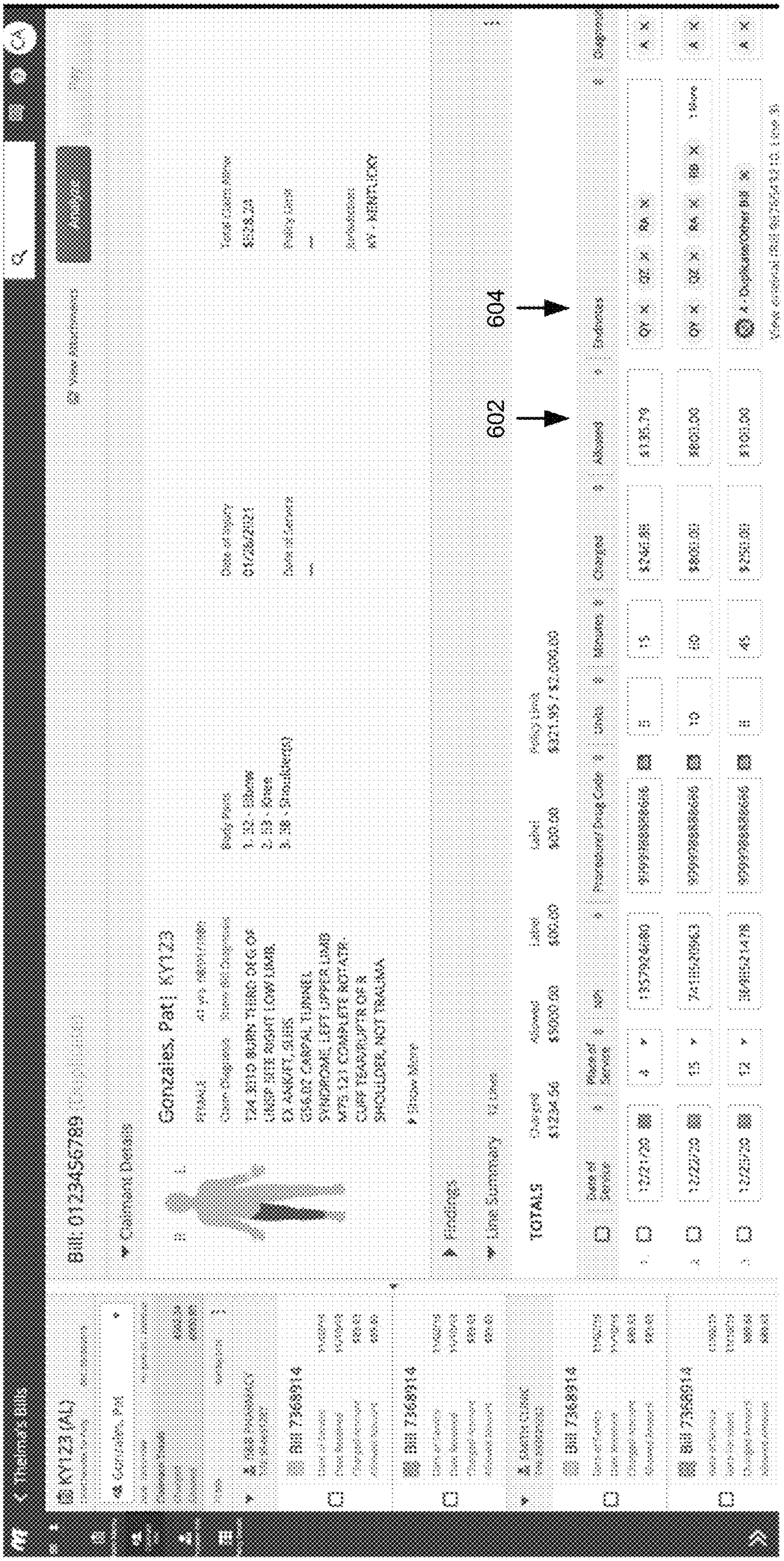
FIG. 6 depicts another example user interface for editing individual lines of the electronic medical bill according to some embodiments of the disclosed technology.

FIG. 6 depicts another example user interface for editing individual lines of an electronic medical bill according to some embodiments of the disclosed technology. This user interface includes a provider detailed billing view showing an array of services and treatments billed to an injured party. This user interface also enables interactions to reference a claimant's claimed injuries, review related findings, and edit amounts considered for payment, at 602, and supporting rationale, at 604.

In some embodiments, determining the likelihood of acceptance of the recommended amount may involve the use of one or more trained machine learning models. For example, the platform 102 may provide the selected scenario as inference input to a trained machine learning model. The trained machine learning model may have been trained with historical scenarios and corresponding acceptances of recommended amounts by particular lawyers and/or law firms. Responsive to the inference input, the trained machine learning model may output the likelihood of acceptance of the recommended amount. Some embodiments include training this machine learning model. For example, the platform 102 may obtain or generate a training data set comprising historical scenarios and corresponding acceptances of recommended amounts by particular lawyers and/or law firms, and may train the machine learning model using the training data set.

In some embodiments, the disclosed technologies may include the use of one or more trained machine learning models at one or more points in the described processes. Any machine learning models may be used. For example, the machine learning models and techniques may be a classifier implemented with a neural network.

The neural network may include a feature extraction layer that extracts features from the input data, e.g., a medical bill. The input data may be obtained from multiple sources and platforms. These data sources may indicate payment amounts that providers have accepted for similar claims or have agreed to be paid for similar claims in the past. In some embodiments, this process may be performed after preprocessing the input data. The preprocessing may include input data transformation. The input data transformation may include converting different file types (e.g., image format, word format, etc.) into a unified digital format (e.g., pdf file). The preprocessing may include data extraction. The data extraction may include extracting useful information, for example using optical character recognition (OCR) and natural language processing (NLP) techniques.

The feature extraction in the feature extraction layer may be performed against the extracted data. Examples of features for extraction could include the total cost, itemized charges, diagnosis codes, clinical concepts, or any other relevant information present in the bills. The selection of the features for extraction may also be determined by learning importance scores for the candidate features using a tree-based machine learning model.

For example, the tree-based machine learning model for feature selection may use Random Forests or Gradient Boosting. The model includes an ensemble of decision trees that collectively make predictions. To begin, the tree-based model may be trained on a labeled dataset. The dataset may include historical medical bills with two layers of labels. The first layer of labels of the historical medical bills may include messages representing reasons for approving, denying, or repricing at least one of the lines of the historical medical bills. The second layer of labels of the historical medical bills may include the actual costs of the historical medical bills. The first layer of labels may be used to train the tree-based machine learning model, such that the selected features can efficiently and accurately predict the actions (e.g., approving, denying, or repricing at least one of the lines) for the given medical bills. The second layer of labels, on the other hand, may be used to train the subsequent classification model, i.e., the neural network, for predicting the cost estimates for the given medical bills.

As the tree-based machine learning model learns to make predictions, it recursively splits the data (historical medical bills) based on different features, constructing a tree structure that captures patterns in the data. One of the advantages of tree-based models is that they can generate feature importance scores for each input feature. These scores reflect the relative importance of each feature in contributing to the model's predictive power. A higher importance score indicates that a feature has a greater influence on the model's decision-making process.

In some embodiments, Gini importance metric may be used for feature importance in the tree-based model. Gini importance quantifies the total reduction in the Gini impurity achieved by each feature across all the trees in the ensemble. Features that lead to a substantial decrease in impurity when used for splitting the data are assigned higher importance scores.

Once the tree-based model is trained, the feature importance scores may be extracted. By sorting the features in descending order based on their scores, a ranked list of features may be obtained. This ranking enables prioritizing the features that have the most impact on the model's decision-making process.

Based on the feature ranking, the top features may be extracted from an incoming medical bill (the incoming bill may go through preprocessing before the features being extracted) and fed into the neural network to generate reasons for approving, denying, or repricing at least one of the lines of the electronic medical bills as well as cost estimates of the electronic medical bills. In some embodiments, the neural network may include multiple output branches: a first branch for generating reasons for approving, denying, or repricing at least one of the lines of the electronic medical bills, and a second branch for generating the cost estimates of the electronic medical bills. The first branch may be a classification branch, which may include a sigmoid activation function to output a percentage for each of the possible actions. The second branch may be a regression branch because its output variable is a continuous numerical value (the cost estimate), as opposed to discrete class labels in the classification branch (which action to perform). These two branches are jointly trained, and share the same feature embedding layer (for weighting the key features) but may have separate convolution layer(s) (for extracting the latent relationships between the key features and the outputs).

During training of the neural network, the generated cost estimates may be compared with the second layer labels of the training data to obtain a loss using a loss function. The loss may be backpropagated through the neural networks to adjust the weights and/or bias of the layers within the neural network to minimize the loss (e.g., based on the gradients).

Some embodiments include the training of the neural network. The training may be supervised, unsupervised, or a combination thereof, and may continue between operations for the lifetime of the system. The training may include creating a training set that includes the input parameters and corresponding assessments described above.

The training may include one or more second stages. This retraining may be performed periodically and/or on the occurrence of one or more trigger conditions. The trigger conditions may include an evaluation metric falling below a predefined metric. A second stage may follow the training and use of the trained machine learning models, and may include creating a second training set, and training the trained machine learning models using the second training set. The second training set may include the inputs applied to the machine learning models, and the corresponding outputs generated by the machine learning models, during actual use of the machine learning models. The second training set may include evolving underlying data.

The second training stage may include identifying erroneous assessments generated by the machine learning model, and adding the identified erroneous assessments to the second training set. Creating the second training set may also include adding the inputs corresponding to the identified erroneous assessments to the second training set.

For example, the training may include supervised learning with labeled training data (e.g., historical inference input with two layers of labels for training purposes). As explained above, the first layer of labels may be used to train a feature selection tree-based machine learning model to determine the key features to extract from any input medical bills. After the key features are determined, the first layer of labels may be used again to train the feature embedding layer (that embeds the extracted features into numeric vectors) as well as a classification output branch. The second layer of labels may be used to jointly train the feature embedding layer as well as a regression output branch. The training may be performed iteratively. The training may include techniques such as forward propagation, loss function, backpropagation for calculating gradients of the loss, and updating weights for each input.

The training may include a stage to initialize the model. This stage may include initializing parameters of the model, including weights and biases, and may be performed randomly or using predefined values. The initialization process may be customized to suit the type of model.

The training may include a forward propagation stage. This stage may include a forward pass through the model with a batch of training data. The input data may be multiplied by the weights, and biases may be added at each layer of the model. Activation functions may be applied to introduce non-linearity and capture complex relationships.

The training may include a stage to calculate loss. This stage may include computing a loss function that is appropriate for binary classification, such as binary cross-entropy or logistic loss. The loss function may measure the difference between the predicted output and the actual binary labels.

The training may include a backpropagation stage. Backpropagation involves propagating error backward through the network and applying the chain rule of derivatives to calculate gradients efficiently. This stage may include calculating gradients of the loss with respect to the model's parameters. The gradients may measure the sensitivity of the loss function to changes in each parameter.

The training may include a stage to update weights of the model. The gradients may be used to update the model's weights and biases, aiming to minimize the loss function. The update may be performed using an optimization algorithm, such as stochastic gradient descent (SGD) or its variants (e.g., Adam, RMSprop). The weights may be adjusted by taking a step in the opposite direction of the gradients, scaled by a learning rate.

The training may iterate. The training process may include multiple iterations or epochs until convergence is reached. In each iteration, a new batch of training data may be fed through the model, and the weights adjusted based on the gradients calculated from the loss.

The training may include a model evaluation stage. Here, the model's performance may be evaluated using a separate validation or test dataset. The evaluation may include monitoring metrics such as accuracy, precision, recall, and mean squared error to assess the model's generalization and identify possible overfitting.

The training may include stages to repeat and fine-tune the model. These stages may include adjusting hyperparameters (e.g., learning rate, regularization) based on the evaluation results and iterating further to improve the model's performance. The training can continue until convergence, a maximum number of iterations, or a predefined stopping criterion.

The described technology provides, among other things, features that may be applied to third-party liability exposures, and especially to the combination of provider networks and direct provider negotiations for third-party claims. While described as an end to end solution, alternate implementations may be employed that utilize one or more of the described components separately or based strictly on existing first-party workflows.

The described technology provides several advantages over conventional solutions. The described technology improves the user experience for third-party adjusters by delivering the right information for each unique user without unnecessary complexity that might be present in systems designed for other user roles. The method calculates multiple scenarios where prior approaches are limited to displaying a single result. The described technology enhances adjuster understanding of medical bill details without the complexity of conventional first-party interfaces. The described technology allows users to complete liability, specials, and general injury evaluation in one place in the user interface without the need to go to multiple portals. The described technology allows adjusters to perform common actions across multiple bills at the same time, e.g. deny, reprice, and allow. The described technology helps adjusters improve negotiations outcomes with attorneys representing third-party claimants by providing rationales and corresponding costs for multiple scenarios. The described technology provides both a user interface and an underlying system that simplifies recording of a final settlement and building a database of accepted values.

Figure 7:
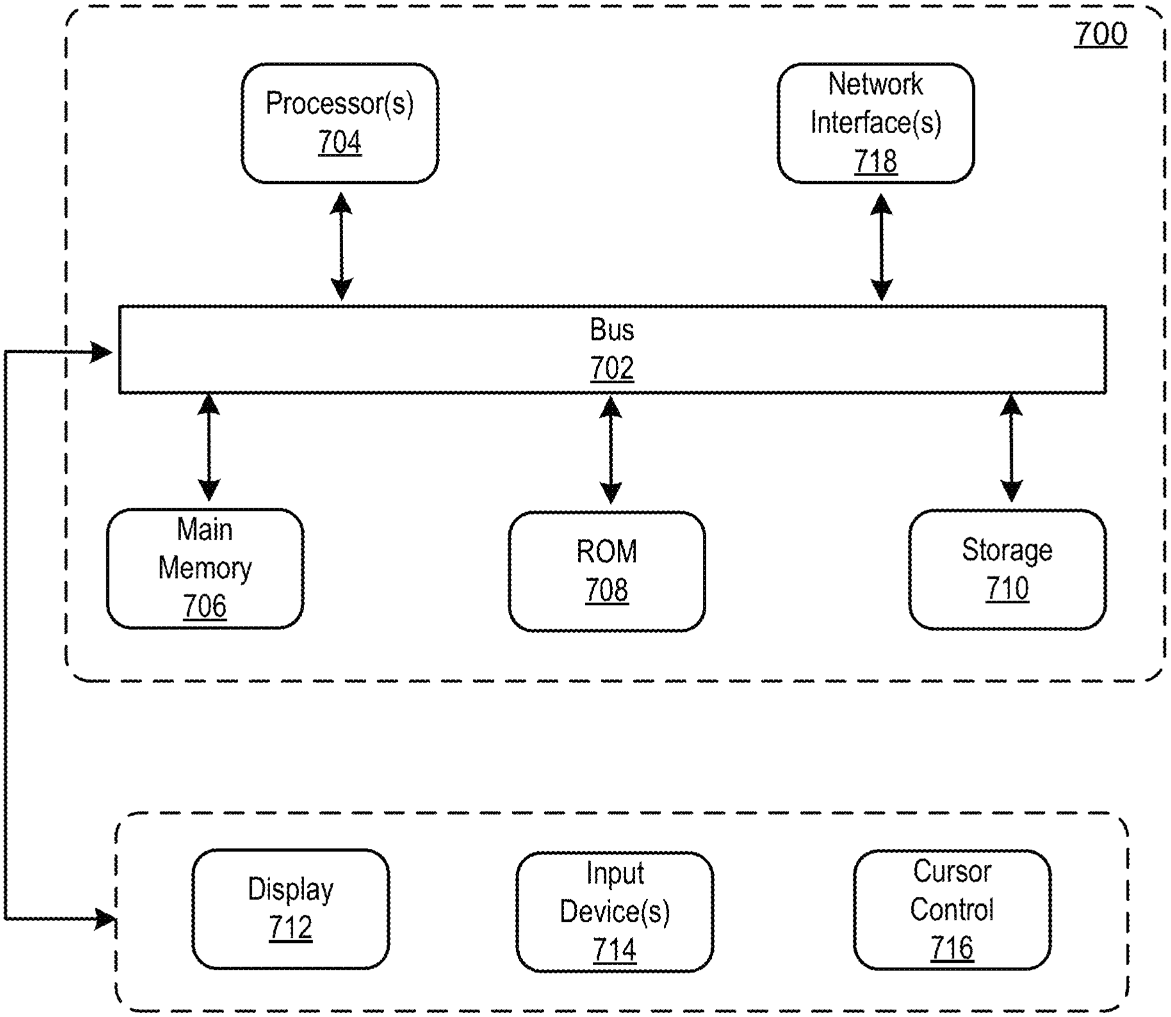
FIG. 7 is an example computing component that may be used to implement various features of embodiments described in the present disclosure.

FIG. 7 depicts a block diagram of an example computer system 700 in which embodiments described herein may be implemented. The computer system 700 includes a bus 702 or other communication mechanism for communicating information, one or more hardware processors 704 coupled with bus 702 for processing information. Hardware processor(s) 704 may be, for example, one or more general purpose microprocessors.

The computer system 700 also includes a main memory 706, such as a random access memory (RAM), cache and/or other dynamic storage devices, coupled to bus 702 for storing information and instructions to be executed by processor 704. Main memory 706 also may be used for storing temporary variables or other intermediate information during execution of instructions to be executed by processor 704. Such instructions, when stored in storage media accessible to processor 704, render computer system 700 into a special-purpose machine that is customized to perform the operations specified in the instructions.

The computer system 700 further includes a read only memory (ROM) 708 or other static storage device coupled to bus 702 for storing static information and instructions for processor 704. A storage device 710, such as a magnetic disk, optical disk, or USB thumb drive (Flash drive), etc., is provided and coupled to bus 702 for storing information and instructions.

The computer system 700 may be coupled via bus 702 to a display 712, such as a liquid crystal display (LCD) (or touch screen), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. In some embodiments, the same direction information and command selections as cursor control may be implemented via receiving touches on a touch screen without a cursor.

The computing system 700 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word “component,” “engine,” “system,” “database,” data store,” and the like, as used herein, can refer to logic electronic medical embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor(s) 704 executing one or more sequences of one or more instructions contained in main memory 706. Such instructions may be read into main memory 706 from another storage medium, such as storage device 710. Execution of the sequences of instructions contained in main memory 706 causes processor(s) 704 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 710. Volatile media includes dynamic memory, such as main memory 706. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 702. Transmission media can also take the form of acoustic or light waves, such as those generated during radio-wave and infra-red data communications.

The computer system 700 also includes a communication interface 718 coupled to bus 702. Network interface 718 provides a two-way data communication coupling to one or more network links that are connected to one or more local networks. For example, communication interface 718 may be an integrated services digital network (ISDN) card, cable modem, satellite modem, or a modem to provide a data communication connection to a corresponding type of telephone line. As another example, network interface 718 may be a local area network (LAN) card to provide a data communication connection to a compatible LAN (or a WAN component to communicate with a WAN). Wireless links may also be implemented. In any such implementation, network interface 718 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet." Local network and Internet both use electrical, electromagnetic or optical signals that carry digital data streams. The signals through the various networks and the signals on network link and through communication interface 718, which carry the digital data to and from computer system 700, are example forms of transmission media.

The computer system 700 can send messages and receive data, including program code, through the network(s), network link and communication interface 718. In the Internet example, a server might transmit a requested code for an application program through the Internet, the ISP, the local network and the communication interface 718.

The received code may be executed by processor 704 as it is received, and/or stored in storage device 710, or other non-volatile storage for later execution.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computers processors, not only residing within a single machine, but deployed across a number of machines.

As used herein, a circuit might be implemented utilizing any form of hardware, or a combination of hardware and software. For example, one or more processors, controllers, ASICs, PLAs, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto, such as computer system 700.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

The foregoing description of the present disclosure has been provided for the purposes of illustration and description. It is not intended to be exhaustive or to limit the disclosure to the precise forms disclosed. The breadth and scope of the present disclosure should not be limited by any of the above-described exemplary embodiments. Many modifications and variations will be apparent to the practitioner skilled in the art. The modifications and variations include any relevant combination of the disclosed features. The embodiments were chosen and described in order to best explain the principles of the disclosure and its practical application, thereby enabling others skilled in the art to understand the disclosure for various embodiments and with various modifications that are suited to the particular use contemplated. It is intended that the scope of the disclosure be defined by the following claims and their equivalence.

The invention claimed is:

1. A system for adjusting one or more electronic medical bills for a claimant injured in an accident, comprising:

one or more hardware processors; and a memory coupled with the one or more hardware processors and comprising a set of instructions which, when executed by the one or more hardware processors, causes the one or more hardware processors to:

generate a user interface to be presented to a claims adjuster;

receive a first user input via the user interface, the first user input identifying a claimant;

responsive to receiving the first user input, retrieve multiple electronic medical bills, each electronic medical bill having at least one line, each line representing a medical service provided to the identified claimant;

preprocess the received multiple electronic medical bills, wherein preprocessing the received multiple electronic bills comprises performing an input data transformation on each of the received multiple electronic bills;

aggregate the preprocessed electronic medical bills;

provide the aggregated electronic medical bills as inference input to a trained machine learning model, wherein the trained machine learning model has been trained with historical electronic medical bills and corresponding findings and scenarios;

generate, by the trained machine learning model, one or more findings and multiple scenarios based on the inference input, wherein the one or more findings represent rationales for approving, denying, or repricing at least one of the lines of the electronic medical bills, and wherein the multiple scenarios include cost estimates based on the one or more findings;

present the one or more findings and the one or more scenarios in the user interface;

receive second user input via the user interface, the second user input representing a selected one of the scenarios; and responsive to the second user input, generate at least one adjusted electronic medical bill.

2. The system of claim 1, wherein the instructions further cause the processor to:

receive third user input via the user interface, the third user input representing an acceptance or rejection of one or more lines of one of the electronic medical bills; and responsive to the third user input, modify at least one of the scenarios; and present the modified at least one of the scenarios in the user interface.

3. The system of claim 1, wherein the instructions further cause the processor to:

obtain a training data set comprising the historical electronic medical bills and corresponding findings and scenarios; and train the machine learning model using the training data set.

4. The system of claim 1, wherein the rationales represented by the one or more findings comprise at least one of:

vertical determinations based on intervals between a date of injury of the claimant and a date of a corresponding treatment identified in the aggregated electronic medical bills; and horizontal determinations based on known effectiveness of a treatment identified in the aggregated electronic medical bills.

5. The system of claim 1, wherein the instructions further cause the processor to present, in the user interface, at least one of:

a charged amount representing a total cost corresponding to the aggregated electronic medical bills;

a low evaluation amount corresponding to the scenario having the lowest cost estimate;

a high evaluation amount corresponding to the scenario having the highest cost estimate; and a recommended amount corresponding to the selected one of the scenarios.

6. The system of claim 5, wherein the instructions further cause the processor to:

determine a likelihood of acceptance of the recommended amount based on historical acceptances of recommended amounts by at least one of attorneys and law firms; and present, in the user interface, a representation of the likelihood of acceptance of the recommended amount.

7. The system of claim 6, wherein determining a likelihood of acceptance of the recommended amount comprises:

providing the selected one of the scenarios as further inference input to a further trained machine learning model, wherein the further trained machine learning model has been trained with historical scenarios and corresponding acceptances of recommended amounts, wherein responsive to the inference input, the further trained machine learning model outputs the likelihood of acceptance of the recommended amount.

8. One or more non-transitory machine-readable storage media comprising a set of instructions stored therein which, when executed by a processor, causes the processor to:

generate a user interface to be presented to a claims adjuster;

receive a first user input via the user interface, the first user input identifying a claimant;

responsive to receiving the first user input, retrieve multiple electronic medical bills, each electronic medical bill having at least one line, each line representing a medical service provided to the identified claimant;

preprocess the received multiple electronic medical bills, wherein preprocessing the received multiple electronic bills comprises performing an input data transformation on each of the received multiple electronic bills;

aggregate the preprocessed electronic medical bills;

provide the aggregated electronic medical bills as inference input to a trained machine learning model, wherein the trained machine learning model has been trained with historical electronic medical bills and corresponding findings and scenarios;

generate, by the trained machine learning model, one or more findings and multiple scenarios based on the inference input, wherein the one or more findings represent rationales for approving, denying, or repricing at least one of the lines of the electronic medical bills, and wherein the multiple scenarios include cost estimates based on the one or more findings;

present the one or more findings and the one or more scenarios in the user interface;

receive second user input via the user interface, the second user input representing a selected one of the scenarios; and responsive to the second user input, generate at least one adjusted electronic medical bill.

9. The non-transitory machine-readable storage media of claim 8, wherein the instructions further cause the processor to:

receive third user input via the user interface, the third user input representing an acceptance or rejection of one or more lines of one of the electronic medical bills; and responsive to the third user input, modify at least one of the scenarios; and present the modified at least one of the scenarios in the user interface.

10. The non-transitory machine-readable storage media of claim 8, wherein the instructions further cause the processor to:

obtain a training data set comprising the historical electronic medical bills and corresponding findings and scenarios; and train the machine learning model using the training data set.

11. The non-transitory machine-readable storage media of claim 8, wherein the rationales represented by the one or more findings comprise at least one of:

vertical determinations based on intervals between a date of injury of the claimant and a date of a corresponding treatment identified in the aggregated electronic medical bills; and horizontal determinations based on known effectiveness of a treatment identified in the aggregated electronic medical bills.

12. The non-transitory machine-readable storage media of claim 8, wherein the instructions further cause the processor to present, in the user interface, at least one of:

a charged amount representing a total cost corresponding to the aggregated electronic medical bills;

a low evaluation amount corresponding to the scenario having the lowest cost estimate;

a high evaluation amount corresponding to the scenario having the highest cost estimate; and a recommended amount corresponding to the selected one of the scenarios.

13. The non-transitory machine-readable storage media of claim 12, wherein the instructions further cause the processor to:

determine a likelihood of acceptance of the recommended amount based on historical acceptances of recommended amounts by at least one of attorneys and law firms; and present, in the user interface, a representation of the likelihood of acceptance of the recommended amount.

14. The non-transitory machine-readable storage media of claim 13, wherein determining a likelihood of acceptance of the recommended amount comprises:

providing the selected one of the scenarios as further inference input to a further trained machine learning model, wherein the further trained machine learning model has been trained with historical scenarios and corresponding acceptances of recommended amounts, wherein responsive to the inference input, the further trained machine learning model outputs the likelihood of acceptance of the recommended amount.

15. A computer-implemented method for adjusting one or more electronic medical bills for a claimant injured in an accident, the method comprising:

generating, by a processor of a management platform, a user interface to be presented to a claims adjuster;

receiving, by the processor of the management platform, a first user input via the user interface, the first user input identifying a claimant;

responsive to receiving the first user input, retrieving, by the processor of the management platform, multiple electronic medical bills, each electronic medical bill having at least one line, each line representing a medical service provided to the identified claimant;

preprocessing, by the processor of the management platform, the received multiple electronic medical bills, wherein preprocessing the received multiple electronic bills comprises performing an input data transformation on each of the received multiple electronic bills;

aggregating, by the processor of the management platform, the preprocessed electronic medical bills;

generating, by the processor of the management platform, one or more findings and multiple scenarios by providing the aggregated electronic medical bills as inference input to a trained machine learning model, wherein the trained machine learning model has been trained with historical electronic medical bills and corresponding findings and scenarios;

generating, by the processor of the management platform, using the trained machine learning model, the one or more findings and the multiple scenarios, wherein the one or more findings represent rationales for approving, denying, or repricing at least one of the lines of the electronic medical bills, and wherein the multiple scenarios include cost estimates based on the one or more findings;

presenting, by the processor of the management platform, the one or more findings and the one or more scenarios in the user interface;

receiving, by the processor of the management platform, second user input via the user interface, the second user input representing a selected one of the scenarios; and responsive to the second user input, generating, by the processor of the management platform, at least one adjusted electronic medical bill.

16. The computer-implemented method of claim 15, further comprising:

receiving, by the processor of the management platform, third user input via the user interface, the third user input representing an acceptance or rejection of one or more lines of one of the electronic medical bills; and responsive to the third user input, modifying, by the processor of the management platform, at least one of the scenarios; and presenting, by the processor of the management platform, the modified at least one of the scenarios in the user interface.

17. The computer-implemented method of claim 15, further comprising:

obtaining, by the processor of the management platform, a training data set comprising the historical electronic medical bills and corresponding findings and scenarios; and training, by the processor of the management platform, the machine learning model using the training data set.

18. The computer-implemented method of claim 15, wherein the rationales represented by the one or more findings comprise at least one of:

vertical determinations based on intervals between a date of injury of the claimant and a date of a corresponding treatment identified in the aggregated electronic medical bills; and horizontal determinations based on known effectiveness of a treatment identified in the aggregated electronic medical bills.

19. The computer-implemented method of claim 15, further comprising presenting, by the processor of the management platform, in the user interface, at least one of:

a charged amount representing a total cost corresponding to the aggregated electronic medical bills;

a low evaluation amount corresponding to the scenario having the lowest cost estimate;

a high evaluation amount corresponding to the scenario having the highest cost estimate; and a recommended amount corresponding to the selected one of the scenarios.

20. The computer-implemented method of claim 19, further comprising:

determining, by the processor of the management platform, a likelihood of acceptance of the recommended amount based on historical acceptances of recommended amounts by at least one of attorneys and law firms; and presenting, by the processor of the management platform, in the user interface, a representation of the likelihood of acceptance of the recommended amount.

21. The system of claim 1, wherein the received electronic medical bills comprise a plurality of different file types.

22. The system of claim 21, wherein performing the input data transformation on each of the received multiple electronic bills comprises converting the received electronic medical bills from the plurality of different file types to a unified digital format.

23. The system of claim 1, wherein performing the input data transformation on each of the received multiple electronic bills comprises performing data extraction on the received electronic medical bills.

24. The system of claim 23, wherein the data extraction comprises an Optical Character Recognition (OCR) process.

25. The system of claim 23, wherein the data extraction comprises Natural Language Processing (NLP).

* * * * *